(12) United States Patent
Rubio et al.

(10) Patent No.: US 6,733,811 B2
(45) Date of Patent: May 11, 2004

(54) NIXTAMALIZED CORN FLOUR PROCESS AND APPARATUS IMPROVEMENT FOR RECOVERING HEAT AND REDUCING PARTICULATE EMISSION FROM WASTE HOT AIR

(75) Inventors: Manuel J. Rubio, Miami Beach, FL (US); Roberto Contreras, Guadalupe (MX); Francisco Sosa, Guadalupe (MX)

(73) Assignee: Roberto Gonzalez Barrera, Delegacion Miguel Hidalgo (MX)

( * ) Notice: Subject to any disclaimer, the term of this patent is extended or adjusted under 35 U.S.C. 154(b) by 183 days.

(21) Appl. No.: 10/059,331

(22) Filed: Jan. 31, 2002

(65) Prior Publication Data

US 2003/0143308 A1 Jul. 31, 2003

(51) Int. Cl.[7] .................................................. A23L 1/00
(52) U.S. Cl. ..................... 426/510; 426/506; 426/507; 426/511; 426/463; 426/464; 426/622; 426/626
(58) Field of Search ................................. 426/510, 511, 426/463, 464, 482, 618, 622, 626, 506, 507

(56) References Cited

U.S. PATENT DOCUMENTS

| | | | | |
|---|---|---|---|---|
| 4,329,371 A | * | 5/1982 | Hart | 426/461 |
| 5,447,742 A | * | 9/1995 | Malvido et al. | 426/626 |
| 6,322,836 B1 | * | 11/2001 | Rubio et al. | 426/508 |
| 6,344,228 B1 | * | 2/2002 | Rubio et al. | 426/510 |

OTHER PUBLICATIONS

Alvarez et al., "Biodegradative Treatment of Nixtamalization Wastewaters (Nejayote), Using Immobilized Native Mixed Cultures in Anoxic Environments" Oilnergy, "Natural Gas Price", 2001.

Cereal Foods World, Sahai et al., "A Novel Enzymatic Nixtamalization Process for Producing Corn Masa Flour", 06/01, vol. 46, No. 6, pp. 240–245.

Crown Andersen Inc., "Triven Sizes: For Incinerators Without Heat Recovery Systems", 2001, www.crownandersen.com/techspecs–triven.html.

American Council for an Energy–Efficient Economy, Miriam Pye, "Making Business Sense of Energy Efficiency and Pollution Prevention", 04/98.

American Council for an Energy–Efficient Economy, Pye et al., "Energy Efficiency, Pollution Prevention, and the Bottom Line", 08/97(rev. 10/97).

CRC Press, Inc., Theodore et al., "Industrial Air Pollution Control Equipment for Particulates", 1976, pp. 91–98 and 191–209.

* cited by examiner

Primary Examiner—Lien Tran
(74) Attorney, Agent, or Firm—Young & Thompson

(57) ABSTRACT

A process and apparatus improvement for energy and particulate recovery during the production of nixtamalized corn flour, by precooking with a lime solution to effect partial cooking, reduced energy use for pre-cooking and washing by recycling hot water. Next, moisture content is stabilized, and the corn is milled and dried in a super-heated stream of air with reduced energy consumption by recycling waste hot air. Dust trapping is performed on a portion of waste hot air which is reused for preheating combustion air. Wet scrubbing of the remaining waste hot air is performed where heated water is reused and exhaust air vented. Cooling and further drying of the dried-milled particles follows. A fine grind or flour is separated and recovered from the coarse grind which is also aspirated to isolate a hull fraction as corn waste along with particulate collected after entrapping and scrubbing waste hot air. Re-milling and sieving the coarse grind produces a corn flour for tortilla and the like.

12 Claims, 1 Drawing Sheet

NIXTAMALIZED CORN FLOUR PROCESS AND APPARATUS IMPROVEMENT FOR RECOVERING HEAT AND REDUCING PARTICULATE EMISSION FROM WASTE HOT AIR

BACKGROUND OF THE INVENTION

1. Field of the Invention

The present invention relates to a food system for recovering the heat and preventing pollution from waste hot air after nixtamalized corn dehydration and, more particularly, it relates to a process improvement involving heat recovery from the waste hot air laden with particulate produced after flash drying, especially milled corn and the like, and for minimizing particulate emission in both the exhaust vented to the atmosphere and the hot water recycled to the process.

2. Description of Related Art

Nixtamalized corn flour (NCF) is conventionally produced by alkaline cooking of food-grade corn under atmospheric pressure, steeping and washing, grinding the partially cooked corn (nixtamal) and drying to give corn masa flour. At the industrial or commercial level, "the milling and dehydration" steps are major cost factors. In any case, the availability of an instant flour has many advantages such as shelf-life (4 to 8 months), less labor, lower water and energy use for the customer. Any method which may decrease both time and cost, and still yield an acceptable nixtamalized corn or masa flour product per unit of raw corn, would be advantageous to the final customer.

By combining energy efficiency and pollution prevention technologies is an opportunity for alignment among business, environmental advocates and regulators. The efficient use of resources is key to a sustainable development and industrial ecology. Energy recovery and renewable energy have supplied more than 80% in the US incremental energy requirements since 1973 ($0.25 USD/MM-Btu). But given today's low prices for natural gas ($1.5–2.2 USD in 1997 and $3 USD by mid-2001: oilnergy.com), no realistic reductions in carbon emissions will happen without concerted national programs and incentives to encourage the faster adoption of efficient and renewable energy as well as natural gas. The success and cost effectiveness of this approach have been proven by redesigning or improving processes: reduce/recycle/re-sell waste, reduce energy use and emissions (Acee, 1997).

In this connection, reference is made to the following U.S. Pat. Nos. 4,594,260, 5,176,931, 5,532,013, 6,025,011 and 6,265,013 requiring a low-temperature drying. However, U.S. Pat. Nos. 4,513,018, 5,558,898 and 6,068,873 only used a high-temperature short time dehydration without a heat recovery system. These prior art methods for the industrial production of corn and masa flour involve accelerated cooking with reduced amounts of water along with short processing times as well as low energy requirements for a high yield of the end product.

As previously mentioned by Rubio in U.S. Pat. No. 4,513,018 and more recently by Sunderland in U.S. Pat. No. 5,558,898, the waste hot air produced by combustion of natural gas with excess air is actually not pure combustion gas, but rather a mixture of hot air, water and particulate matter (very fine particles). This hot exhaust mix is drawn from the dryer by a fan and fed into a cyclone for removal of solid and liquid matter (hereafter referred to as dust or particulate) from such waste hot air for pollution control. A single-cyclone is the most widely used of the dry separator having a medium collection efficiency (80–95% for 15–50 micron size), a low pressure drop (2–5 in. water) and a high throughput (Theodore and Buonicore, 1976).

Another method of treating contaminated air from a food processing operation in the past has been by direct incineration or wet scrubbing. A scrubber is a system which uses a liquid, usually water, to achieve the removal of particulates from a gas stream. Scrubbers (particulate collectors) may be loosely categorized by pressure drop (inches of water) or energy consumption (Theodore and Buonicore, 1976): a) Spray chambers and towers (Knapp, 2000: U.S. Pat. No. 6,019,818), for example, provide the lowest drop (<5 in.) and, correspondingly, the lowest collection efficiencies (70–90% for >10 micron), b) Centrifugal fan, atomizing and packed-bed scrubbers have a medium drop (5–15 in.) and medium efficiency (90–95%), and c) Venturi-type has the highest drop (>15 in.) along with the highest efficiency (>99%). In this connection, a high-pressure venturi scrubber (40 in. water) was used commercially in treating a medical waste incinerator exhaust gas which not only claimed a 44% energy recovery for preheating incinerator or combustion air, but also complied with particulate EPA-limits (Andersen, 2001).

A few food processing plants have implemented both energy recovery and particulate emission using wet scrubbers to improve process efficiency during dehydration:

For example, West in U.S. Pat. No. 3,805,686, describes a batch scrubber system for treating moist air laden with particulate matter from a food smoke and drying chamber, cooled to condense liquid and solid out of the air in a dehumidifying tower, and reheated for recycling to the smoke chamber without discharge to the atmosphere.

Furthermore, Williams in U.S. Pat. No. 6,019,819, discloses another improved scrubber for extracting heat from contaminated waste steam. Waste gas is ducted from a food fryer to a condensing tower by spraying water into the gas. This cooled waste gas is pulled into a low pressure water washer, and clean gas is sucked by a fan and vented.

Many applications for heat recovery included waste hot gas from a high-temperature process furnace, an incinerator and a high-temperature direct-fired dryer. Although the above described prior art methods are capable in improving energy or particulate collection efficiency, a low-cost industrial application was still unavailable in the market at the time of the present invention.

SUMMARY AND OBJECTS OF THE INVENTION

The purpose of this invention is to provide a process improvement by reducing particulate matter and extracting heat and from the waste hot air of a flash dryer and recycle said heat into the furnace and washer as well.

Another object of the invention is to use an industrial method not only with a low-energy trapping and scrubbing apparatus, but also with a food process energy saving.

The above and other objects and advantages of the invention are achieved through a process improvement and apparatus applied to the production of nixtamalized corn flour, embodiments of which include pre-cooking with a lime solution so as to effect corn partial cooking, pre-cooking and washing with reduced energy, stabilizing moisture content to an optimum level for grinding, milling and flash dehydration of the milled corn with reduced energy and particulate emission, dust trapping of a portion of waste hot air which is reused for preheating combustion air, wet scrubbing of the remaining waste hot air where heated water is reused and exhaust air vented, cooling and drying the dry-milled particles, separating and recovering the fine grind so produced from the coarse grind while the latter is further aspirated to remove a hull fraction as corn waste, re-milling the isolated coarse grind and further sieving it to obtain a corn flour for tortilla and derivatives thereof.

BRIEF DESCRIPTION OF THE DRAWINGS

The sole drawing FIGURE depicts an embodiment of this invention in flowchart form illustrating the continuous process improvement for energy and particulate recovery and depicting schematically the associated apparatus.

DETAILED DESCRIPTION OF PREFERRED EMBODIMENTS

Figure 1:
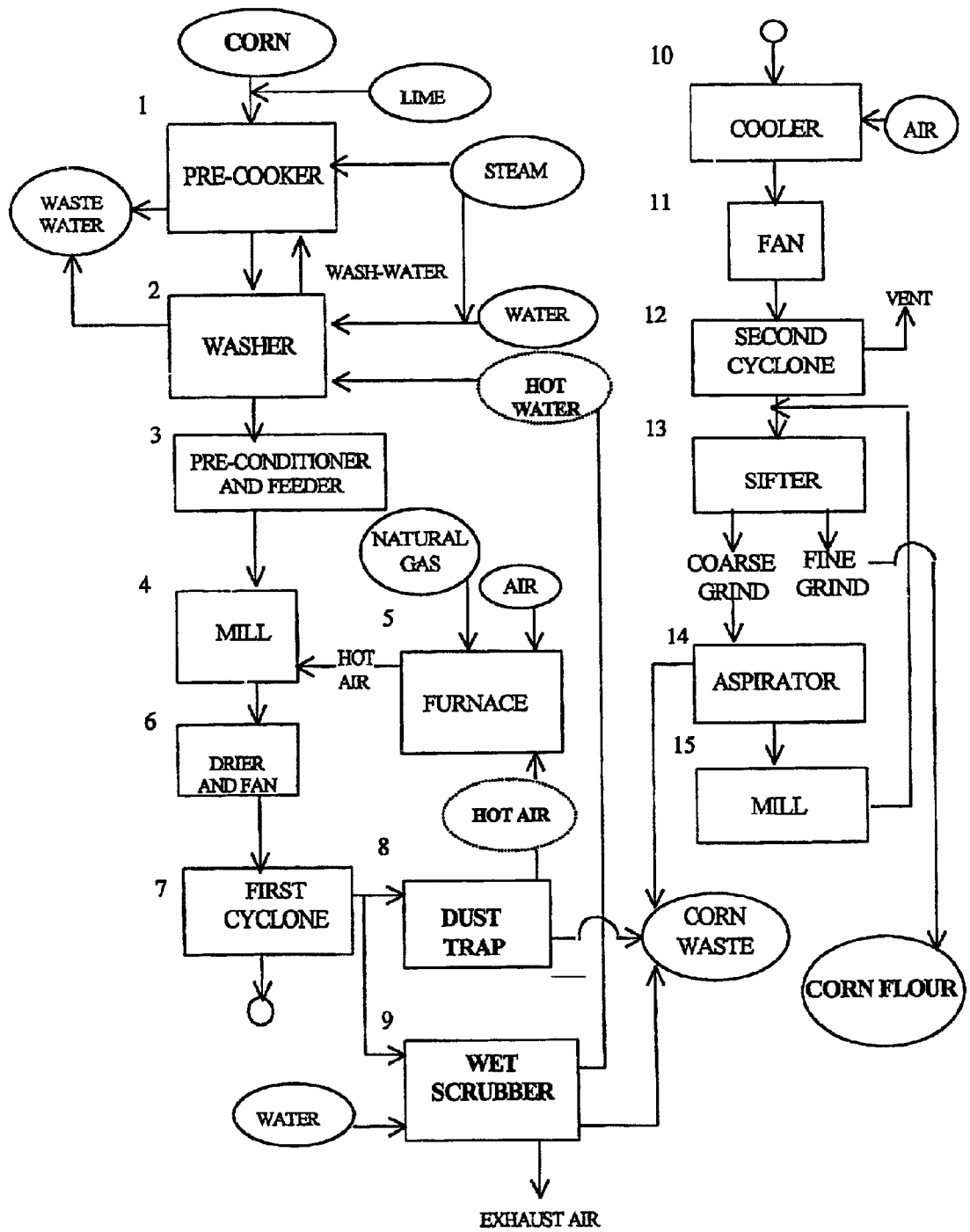

The drawing FIGURE shows a pre-cooker 1; a washer 2; a pre-conditioner 3 with a feeder; a primary mill 4; a furnace 5; a drier 6 with a fan; a first cyclone separator 7; a dust trap for waste hot air 8; a wet scrubber 9 for waste hot air; a cooler 10 with an associated fan 11; a second cyclone separator 12; a sifter 13; an aspirator system 14; and a secondary mill 15.

The pre-cooker 1 is fed with a corn and lime mixture into which hot water recycled from the washer 2 is introduced to form an aqueous suspension which is also heated by steam. By regulating the steam heating along with the kernel residence time, it is possible to precook the corn to a temperature of from about 75° to about 94° C. for a period of 20 to 45 minutes. This allows the precooked kernel to be produced at moisture contents of between 32% and 37%, while the pH is raised to about 9 to 12 with lime. Wastewater in the process is replaced with recycled hot water from the washer 2, which is regulated to maintain the waste solids of the cooker suspension in the range from about 1.0% to about 3.0%. The incoming corn quality, cooking time-temperature profile and process have been proposed as the main factors that determine the organic load in wastewater or "nejayote" (Ramirez and Alvarez, 1995; Jackson and Sahai, 2001).

The partially cooked corn suspension is passed to a washer 2 wherein it is sprayed with steam heated water at a temperature of about 60° to 70° C. and also with hot water at about 53° to 58° C. for 30–60 seconds, recycled from the wet scrubber 9, which serves to wash off excess waste solids.

The washed corn is thereafter passed to a pre-conditioner 3 wherein the precooked corn is tempered to achieve a moisture content of 34–39% for 20–210 minutes.

Thereafter, the preconditioned corn is fed through a feeder, whose design is known per se, to a primary mill 4 such that the milled corn and recycled hot air coming from a furnace 5, are mixed and partially cooked by a dryer 6 whose design is known per se. This milled corn kernel is thereby dried at a high temperature and short time profile, and is partially dried to yield a moisture content of 16% to about 18% depending on the desired particle size.

Waste hot air laden with particulate and moisture is extracted from the dryer 6 with a specially designed fan and fed into a first cyclone separator 7 for solids removal from such waste hot air. Afterwards, the waste hot air (127° C. to about 138° C., and 13% to about 15% moisture) is equally fed into a dust trap 8 and a wet scrubber 9 for further particulate extraction.

A portion of the waste hot air is drafted into a low-pressure dust trap 8 wherein it is removed from particulate. The cleaned hot air (127° C. to 138° C.) is reused and mixed for preheating combustion air in the furnace 5 wherein natural gas is used. Collected solids are removed as waste.

The remaining waste hot air is cocurrently cooled and cleaned downflow by water spray nozzles inside the wet scrubber 9, under a low-pressure drop and a low liquid to gas ratio. The hot water is recycled to the washer 2 while wet coarse solids are isolated as corn waste. At the same time, a cool and clean hot air (96° C. to about 104° C., and 15% to about 18% moisture) is vented through an exhaust manifold.

Moisture laden-warm air is removed from the dry material through a cooler 10 with an associated fan 11, thus further reducing the moisture content from 16–18% to about 9–12% depending upon the shelf-life of the corn flour.

After further extraction of the moisture with a second cyclone separator 12 wherein the warm exhaust air (49° C. to 52° C.) is vented, the precooked dry flour is directed to a sifter 13 wherein the fine grind is separated as corn flour and the coarse grind is further processed.

The latter coarse grind is further separated in the aspirator system 14 wherein two fractions are obtained, a light hull fraction which is isolated as waste for feed with a moisture content between 9% to 12% (representing from about 3% to 5% of the total weight of incoming corn), and a heavy coarse fraction that is re-milled in a secondary mill 15. The milled product from secondary mill 15 is recycled to the sifter 13 for further sieving and producing a homogeneous corn flour for tortilla and the like.

The low-pressure dust trap of the present invention results in a 78% reduction in particulate matter emission flowrate and from a 36% to about 38% reduction in load emission (40 CFR, part 60, Appendix A-EPA) with correspondingly lower environmental costs. It also achieves a 25% to about 30% energy recovery in the furnace by recycling the waste hot air, as compared to the conventional process.

In this method, the low-pressure wet scrubber results in a range of 75% to 81% decrease in particulate emission matter flowrate and from a 65% to about 72% decrease in load emission (40 CFR, part 60, Appendix A-EPA), with correspondingly lower energy costs, as compared to the industrial process. Furthermore, the low liquid to waste hot air ratio in the scrubber allows a 20% to about 25% reduced energy usage in the washer and pre-cooker by reusing such hot water with correspondingly lower water usage costs.

From the foregoing, it will be apparent that it is possible to improve a nixtamalized corn flour process with low-cost industrial apparatus which is efficient because of a reduced energy consumption and particulate emission, wherein the recovery of this loss results in a higher energy saving and a lower pollution from waste hot air than would have been possible absent the features of this invention.

While the present invention has been described above in connection with the embodiments of this invention herein illustrated and described in detail and with published references, these are by way of illustration and not of limitation. After reading this disclosure, it will be apparent to those skilled in this art that various changes and modifications can be made without departing from the spirit and scope of the present invention.

We claim:

1. A process for energy and particulate recovery during production of nixtamalized corn flour, comprising the steps of:

pre-cooking corn kernel using steam and a lime solution to effect partial cooking of the corn kernel, washing the precooked corn kernel with steam heated water and hot water that is recycled from a downstream scrubbing of waste hot air, stabilizing a moisture content of said washed and pre-cooked corn kernel to within a predetermined range, milling said stabilized corn kernel and flash drying said milled corn kernel using a furnace, producing waste hot air, the furnace receiving as preheated combustion air recycled cleaned hot air, dust trapping a first portion of the waste hot air for particulate removal to produce the cleaned hot air fed to the furnace, wet scrubbing a second portion of the waste hot air with water spraying for particulate extraction to produce said hot water used in the washing step, cooling and drying said dry-milled particles with ambient air having a low moisture content, separating and recovering said dry milled particles into a finer fraction, under 25 to 60 mesh, and a coarser fraction that is further aspirated to remove corn hull as waste and thereafter re-milled, collecting the finer fraction with a predetermined size as corn flour.

2. The method according to claim 1 wherein said hull and particulate collected after the dust trapping and scrubbing steps is a fraction representing from 3% to about 5% of the total weight of corn kernel.

3. The method according to claim 1, further comprising recycling the re-milled coarser fraction.

4. The method of claim 1, wherein the washing step produces heated water, the heated water being recycled as an input to the pre-cooking step.

5. The method of claim 1, wherein the hot water produced by the wet scrubbing step and used in the washing step has a temperature in the range of about 53° C. to 58° C.

6. The method of claim 1, wherein the predetermined moisture range of the precooked corn kernel at an end of the stabilizing step is 34% to about 39%.

7. The method of claim 6, wherein the stabilizing step is performed for between 20 and 210 minutes.

8. The method of claim 1, wherein the flash drying step is performed until the milled corn kernel has a moisture content in the range of about 16% to 18%.

9. The method of claim 1, wherein the waste hot air produced by the flash drying step has a temperature in a range of 127° C. to about 138° C.

10. The method of claim 9, wherein the waste hot air produced by the flash drying step has a moisture content in a range of 13% to about 15%.

11. The method of claim 1, wherein the waste hot air produced by the flash drying step is distributed equally between the first and second portions.

12. The method of claim 1, wherein the furnace is fueled by natural gas.

* * * * *